(12) United States Patent
Tinnin et al.

(10) Patent No.: US 11,685,422 B1
(45) Date of Patent: Jun. 27, 2023

(54) ENERGY ABSORBING ASSEMBLY FOR AN ADJUSTABLE STEERING COLUMN

(71) Applicant: Steering Solutions IP Holding Corporation, Saginaw, MI (US)

(72) Inventors: Melvin L. Tinnin, Clio, MI (US); Joen C. Bodtker, Flint, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/555,188

(22) Filed: Dec. 17, 2021

(51) Int. Cl.
*B62D 1/19* (2006.01)
*B62D 1/185* (2006.01)

(52) U.S. Cl.
CPC .............. *B62D 1/192* (2013.01); *B62D 1/185* (2013.01)

(58) Field of Classification Search
CPC ................................. B62D 1/192; B62D 1/185
See application file for complete search history.

(56) References Cited

U.S. PATENT DOCUMENTS

| | | | | |
|---|---|---|---|---|
| 9,669,862 B1 * | 6/2017 | Dubay | .................... | B62D 1/192 |
| 9,834,246 B1 * | 12/2017 | Woycik | .................. | B62D 1/195 |
| 11,091,198 B2 | 8/2021 | Bodtker et al. | | |
| 2007/0194563 A1 * | 8/2007 | Menjak | .................... | B62D 1/195 |
| | | | | 280/777 |
| 2007/0228716 A1 * | 10/2007 | Menjak | .................... | B62D 1/192 |
| | | | | 280/777 |
| 2017/0259842 A1 * | 9/2017 | Dubay | .................... | B62D 1/195 |
| 2019/0100230 A1 * | 4/2019 | Messing | ................ | B62D 1/195 |
| 2019/0135328 A1 * | 5/2019 | Fricke | .................... | B62D 1/185 |
| 2019/0225255 A1 * | 7/2019 | Ishimura | ................ | B62D 1/185 |
| 2022/0073125 A1 * | 3/2022 | Sauquet | ................ | B62D 1/181 |
| 2022/0126907 A1 * | 4/2022 | Dubay | .................... | F16F 7/126 |

FOREIGN PATENT DOCUMENTS

| | | | |
|---|---|---|---|
| CN | 112141203 A | * 12/2020 | ............... B62D 1/16 |
| EP | 0818379 A2 | * 1/1998 | |

* cited by examiner

*Primary Examiner* — Drew J Brown
(74) *Attorney, Agent, or Firm* — Dickinson Wright PLLC

(57) ABSTRACT

An axially adjustable steering column including a first jacket and a second jacket that is axially movable with respect to the first jacket. The second jacket includes a window and the first jacket includes a connector opening. An energy absorbing assembly includes a lock cam that is located in the window and connected to the second jacket and a strap body that is connected to the first jacket with a fastener extending through the strap body and the connector opening. The connector opening includes a ramp for ejecting the fastener from engagement with the first jacket.

17 Claims, 5 Drawing Sheets

ENERGY ABSORBING ASSEMBLY FOR AN ADJUSTABLE STEERING COLUMN

TECHNICAL FIELD

The following description relates to energy absorbing devices, and more particularly, to a lock cam and an energy absorbing strap in an adjustable steering column.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column assembly for translating steering input to an output that interacts with a steering linkage to ultimately cause the vehicle wheels to turn. Regardless of the steering scheme, steering column assemblies include various safety features, such as airbags to lessen impact forces. In addition, many steering column assemblies are collapsible and include one or more energy absorption features, such as energy absorbing straps, that allow a certain amount of controlled compression.

Some energy absorbing straps are configured to roll along their length to absorb energy, and are often referred to as roll straps. Typically, roll straps absorb energy during the deformation of the strap in an impact event wherein kinetic energy can be dissipated through compression of the steering column assembly. When designing an energy absorption strap, some principle considerations include load requirements, tunability, and packaging. Performance of the energy absorption strap in a collapse event has traditionally been influenced by many factors, including material thickness/width, material properties, and or shapes or features of the strap. As such, performance of the energy absorption strap can be changed on a vehicle-by-vehicle basis via a modification of these characteristics, but often packaging requirements limit the changes that can be made and can become quite complex to fulfill specific requirements during specific stages of the collapse cycle. For example, the lower jacket is oftentimes also required to have large gaps to allow for strap travel, which requires added material to compensate for lost rigidity and strength. Space also oftentimes has to be made for a tail of the strap to feed out unimpeded to control the absorption load further creating packaging difficulties.

Accordingly, there is a continuing need to improve the operational framework of energy absorption features to improve upon packaging, load requirements, and tunability.

SUMMARY

An aspect of the disclosure includes an axially adjustable steering column. The steering column comprises a first jacket and a second jacket that is axially movable with respect to the first jacket. The first jacket includes at least one connector opening. An energy absorbing assembly includes a strap body that is connected to the first jacket with at least one fastener extending through the strap body and the at least one connector opening.

Another aspect of the disclosure includes an energy absorbing assembly for axially adjustable steering column. The energy absorbing assembly comprises a strap body extending between a first end that is configured to be located on an exterior of a first jacket and a second end that is configured to be located on an interior of the first jacket. A curved portion is located between the first end and the second end. A first segment extends between the curved portion and the first end and a second segment extends between the curved portion and the second end. The first segment includes at least one upper aperture for receiving a fastener to connect the first segment to the exterior of the first jacket.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure. These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, unless otherwise expressed herein, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column assembly for translating steering input to an output that interacts with a steering linkage to ultimately cause the vehicle wheels to turn. Regardless of the steering scheme, steering column assemblies include various safety features, such as airbags to lessen impact forces. In addition, many steering column assemblies are collapsible and include one or more energy absorption features, such as energy absorbing straps, that allow a certain amount of compression.

Figure 1:
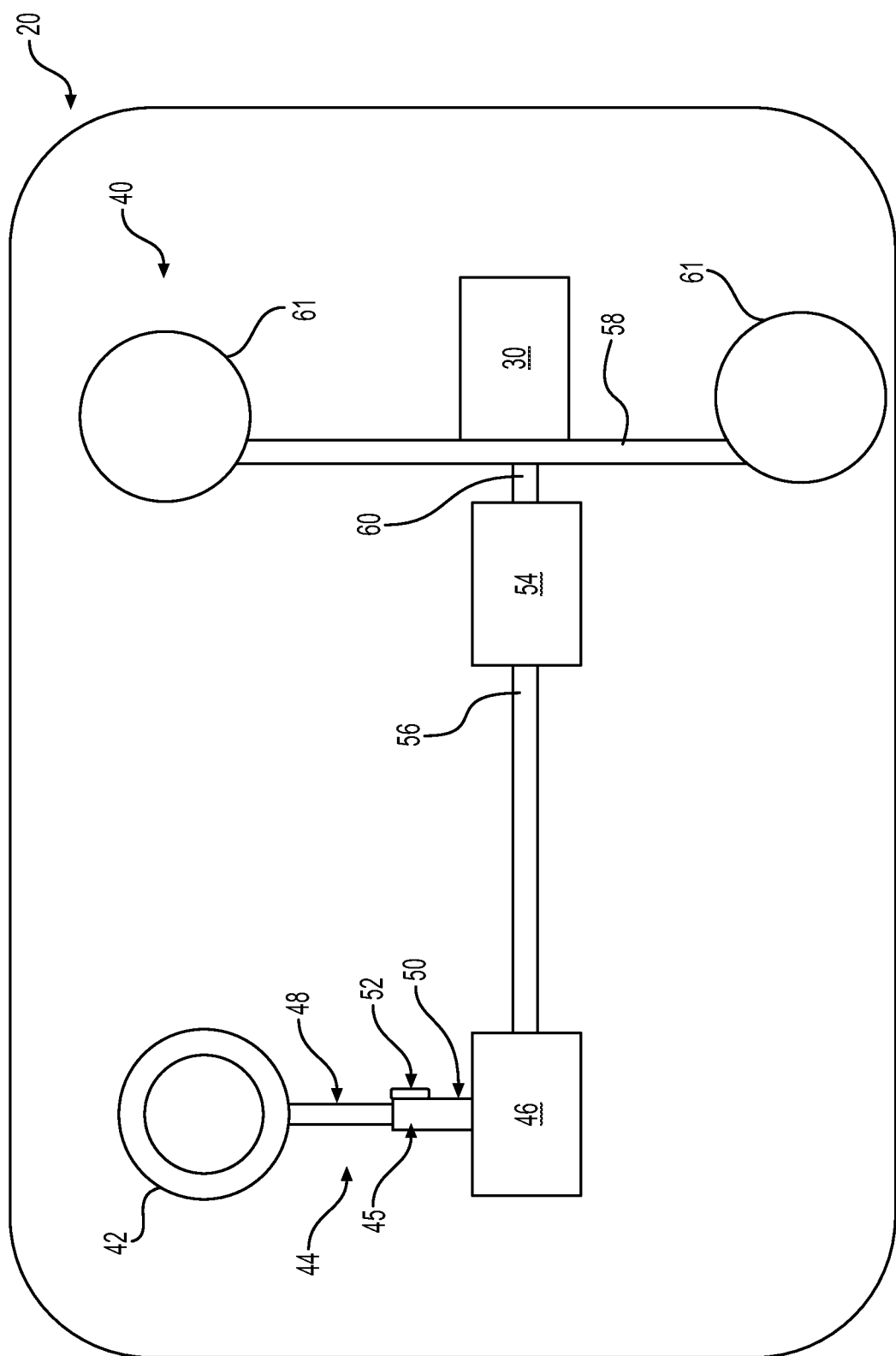
FIG. 1 generally illustrates a vehicle with a steering system according to the principles of the present disclosure.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other suitable vehicles. The vehicle 20 may include a propulsion system 30, such as an ignition system, an electronic system, or combinations thereof.

In some embodiments, the vehicle 20 may further include a steering system 40. The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. A steering column assembly 44 may include a steering column 45 that extends along an axis from the input device 42 to an output assembly 46. The output assembly 46 may include a pinion shaft assembly, an I-shaft, a cardan joint, steer-by-wire components or any other features conventionally located opposite the input device 42.

The steering column 45 may include at least two axially adjustable portions, for example, a first jacket 48 and a second jacket 50 that are axially adjustable with respect to one another. The first jacket 48 may be an upper jacket and a second jacket 50 may be a lower jacket, wherein the first jacket 48 and the second jacket 50 are permitted to move axially with respect to one another during an impact or other compressive forces. The axial movement may include sliding, telescopic, translating, and other axial movements. The steering column assembly 44 may include additional portions that permit axial movement and brackets that provide rake and tilt movement. More particularly, the steering column assembly 44 may include a powered actuator (not shown) wherein the axial adjustments are machine driven.

An energy absorbing assembly 52 may be located on one or each of the first jacket 48, the second jacket 50, any brackets, or combinations thereof, and provide at least one of variable stroke load absorption settings and a steering column lock functionality. The energy absorbing assembly may dissipate kinetic energy between the first jacket 48 and the second jacket 50.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axle to turn the wheels 61.

Figure 2:
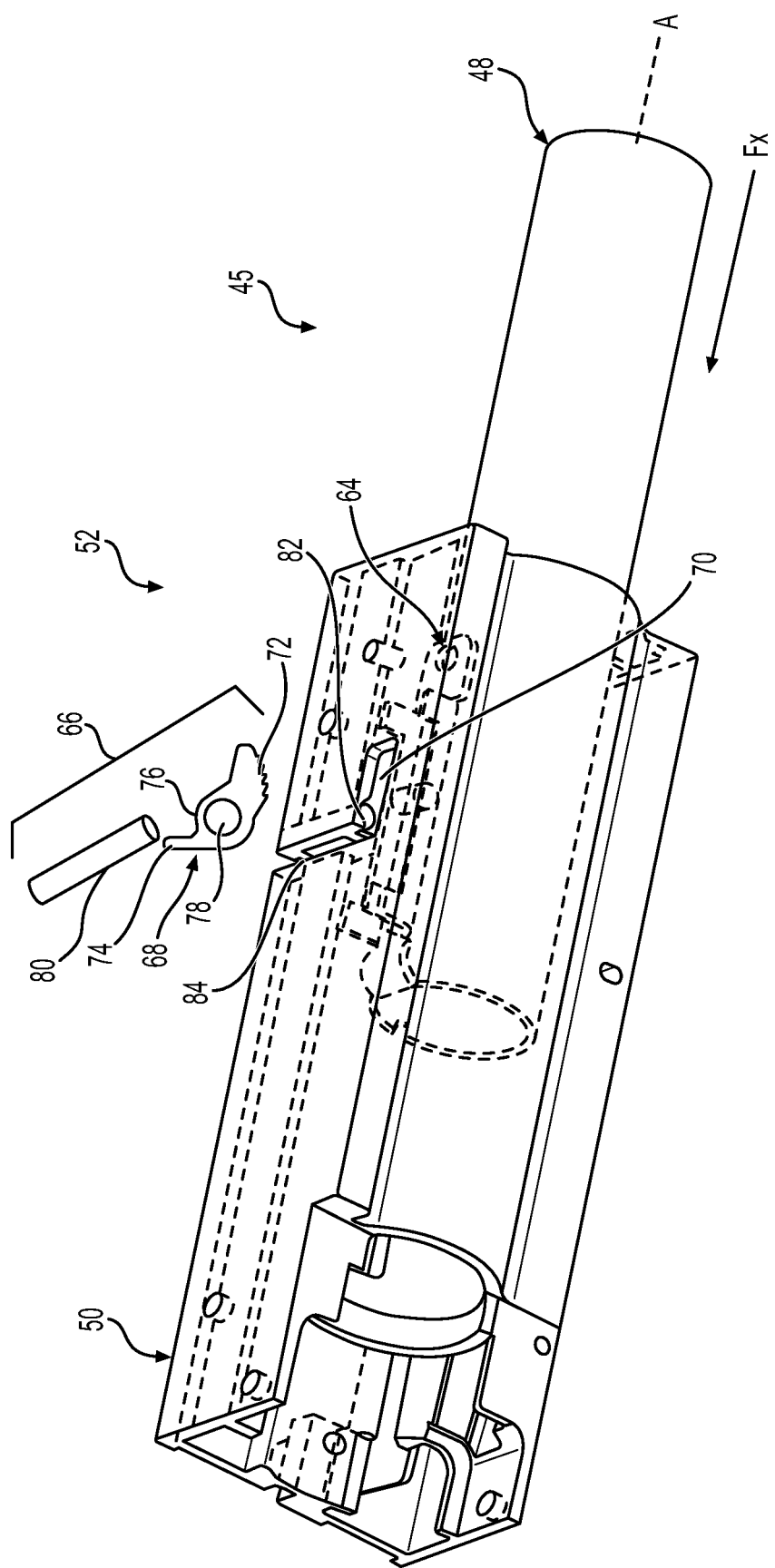
FIG. 2 generally illustrates a steering column with an energy absorbing assembly for dissipating kinetic energy between a first jacket and a second jacket.

FIG. 2 generally illustrates a steering column 45 with the energy absorbing assembly 52 for dissipating kinetic energy between a first jacket 48 and a second jacket 50. The first jacket 48 and the second jacket 50 extend along an axis A. The energy absorbing assembly 52 may be connected to the first jacket 48 (upper jacket), the second jacket 50 (lower jacket), or a combination thereof. In some embodiments, the energy absorbing assembly 52 includes an energy absorbing roll strap body 64 that is at least partially coupled to the first jacket 48 and at least partially extends between the first jacket 48 and the second jacket 50. During a collapse event, a force 'Fx' may move or collapse the first jacket 48 into second jacket 50 along the axis A and the energy absorbing assembly 52 dissipates at least some of the kinetic energy of collapsing first jacket 48 and the second jacket 50.

With continued reference to FIG. 2, the energy absorbing assembly 52 may further include an energy absorbing actuator 66. The energy absorbing actuator 66 includes a lock cam 68 that moves between a locked position and an unlocked position. In the locked position, the lock cam 68 is articulated into a locked engagement with the strap body 64. In the unlocked position, the lock cam 68 is articulated such that it is spaced from the strap body 64. In some embodiments, the second jacket 50 includes a window 70 that locates at least part of the lock cam 68. The lock cam 68 includes a toothed portion 72, a tail portion 74, and a body 76 that spaces the toothed portion 72 from the tail portion 74. The body 76 defines an opening 78 for accommodating a pivot pin 80. In some embodiments, the second jacket 50 includes an aperture 82 for inserting the pivot pin 80 and pivotally connecting the lock cam 68 to the second jacket 50. The window 70 may further include a clamping slot 84 that is transverse to the axis A to clamp the first jacket 48 and the window 70.

Figure 3:
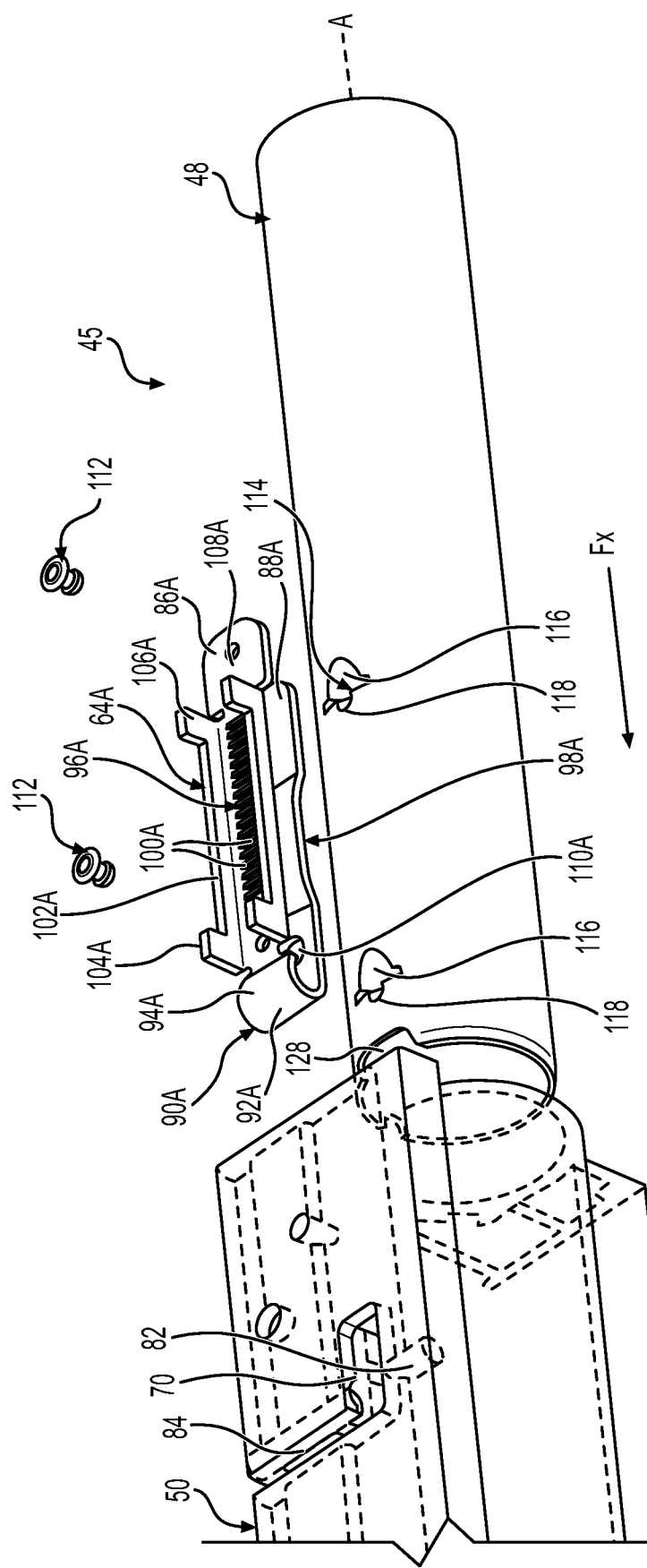
FIG. 3 generally illustrates a disassembled view of the steering column from FIG. 2 with a strap body in accordance with a first arrangement.
Figure 4:
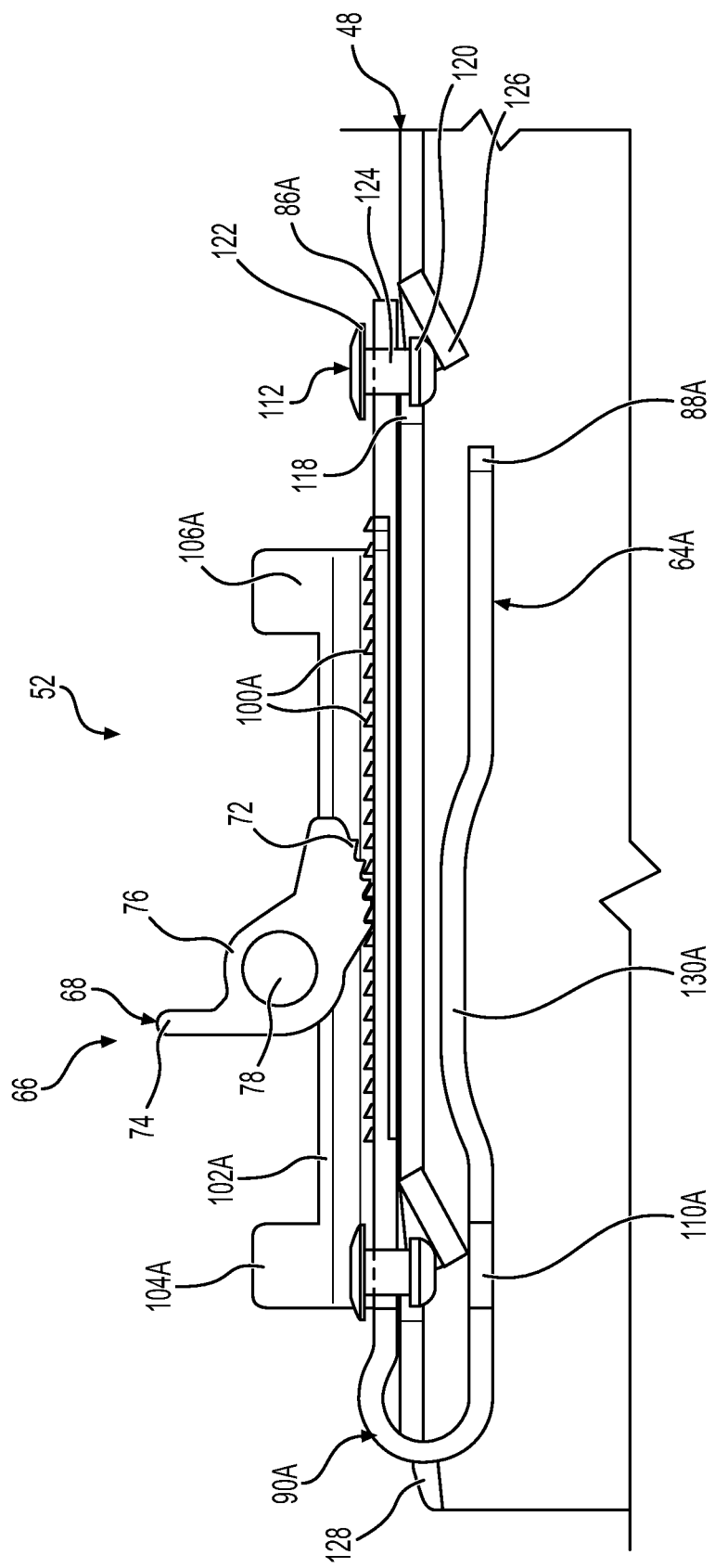
FIG. 4 generally illustrates an enlarged side view of the energy absorption apparatus with the strap body in accordance with the first arrangement.

With reference now to FIG. 3 and FIG. 4, the energy absorbing roll strap body 64A is illustrated in accordance with a first arrangement. The strap body 64A may include a first end 86A and a second end 88A spaced from the first end 86A by an intermediate portion 90A. The first end 86A may be located on an outer surface of the first jacket 48 and the second end 88A may be located on an inner surface of the outer jacket 48 (FIG. 4). The intermediate portion 90A includes a curved portion 92A. The curved portion 92A may facilitate "rolling" of strap body 64A during a collapse event as first end 86A is held stationary and the second end 88A moves in the direction of force 'Fx' (FIG. 2). The intermediate portion 90A may include an initial collapse or roll area 94A that is located between the first segment 96A to a second segment 98A. The first segment 96A may extend from the first end 86A to the intermediate portion 90A. The initial roll area 94A represents the starting roll or deformation location where the "roll" or deformation of strap body 64A begins during a collapse event. The second segment 98A may extend between the intermediate portion 90A and the second end 88A.

The first segment 96A includes a series of teeth 100A extending therefrom. A pair of sidewalls 102A may extend along the first portion 96A on opposite sides of the teeth 100A. Each sidewall 102A may extend between a lower stop tab 104A and an upper stop tab 106A. In use, the lower stop tab 104A may contact a portion of the energy absorbing actuator 66 (e.g. the pivot pin 80) and create a hard stop in a first direction and the upper stop tab 106A may contact a portion of the energy absorbing actuator 66 and create a hard stop in a second direction.

With continued reference to FIG. 3 and FIG. 4, the first segment 96A may include at least one upper aperture 108A (e.g. a pair of upper apertures 108A). The pair of upper apertures 108A may be spaced by the teeth 100A. In some embodiments, the second segment 98A may include at least one lower aperture 110A aligned with at least one of the upper apertures 108A. A connector 112 may be located through each of the upper apertures 108A. In some embodiments, the connectors 112 may include rivets and, during assembly, a rivet may be driven through at least one of the upper apertures 108A and at least one of the lower apertures 110A prior to a rivet tail (not shown) being deformed between the at least one upper aperture 108A and the at least one lower aperture 110A. The lock cam 68 moves between a locked position and an unlocked position. In the locked position (FIG. 4), the lock cam 68 is articulated into a locked engagement with the teeth 100A on the strap body 64A. In the unlocked position, the lock cam 68 is articulated such that it is spaced from the teeth 100A on the strap body 64A.

The first jacket 48 may include at least one connector opening 114 (e.g. a pair of connector openings 114). Each connector opening 114 may include an ejection aperture 116 and a retaining slot 118. The retaining slot 118 may be located on the first jacket 48 and extend towards the second jacket 50 and the ejection aperture 116 may be congruent with, and extend from, the retaining slot 118 (e.g. towards an end of the first jacket 48 opposite the second jacket 50). During assembly, a connector 112 can be placed through the strap body 64A and in each of the connector openings 114 (e.g. the retaining slot 118). As best illustrated in FIG. 4, the connectors 112 include a lower head 120 and an upper head 122 spaced from the lower head 120 by a connector body 124 that provides a smaller cross-section than the lower head 120 and the upper head 122. As such, when the connector body 124 is inserted into the retaining slot 118A it becomes locked from radial and circumferential movement with respect to the axis A and is further locked from axial movement along the axis A towards the second jacket 50.

The first jacket 48 may further include a ramp 126 that extends into each of the ejection apertures 116. Each ramp 126 may be integral with the jacket 48 (e.g. stamped or otherwise deformed from) and includes a semi-bowl shape (FIG. 3). In other arrangements, each ramp 126 may be planar or other shapes. During use, the ramp 126 may route the lower head 120 out of the connector opening 114 when the first jacket 48 is compressed relative to the second jacket 50 along the axis A. In some embodiments, a first segment 96A may extend along the axis A from the intermediate portion 90A a first distance and a second segment 98A may extend from the intermediate portion 90A a second distance that is less than the first. In some embodiments, a second end 88A may terminate before the upper aperture 108A. In some embodiments, the second end 88A may extend an equal distance of the first end 86A and have a second lower aperture (not shown).

The first jacket 48 may further include a terminal end engaged with the curved portion 92. More particularly, the terminal end may be oriented towards the second jacket 50 and define a notch 128 sized to accommodate a width of the curved portion 92. As best illustrated in FIG. 4, the second segment 98A of the strap body 64A may define a bowed portion 130A that extends towards the first segment 96A.

The bowed portion 130A may at least partially be located between a first and second ramp 126 that are spaced along the axis A.

Figure 5:
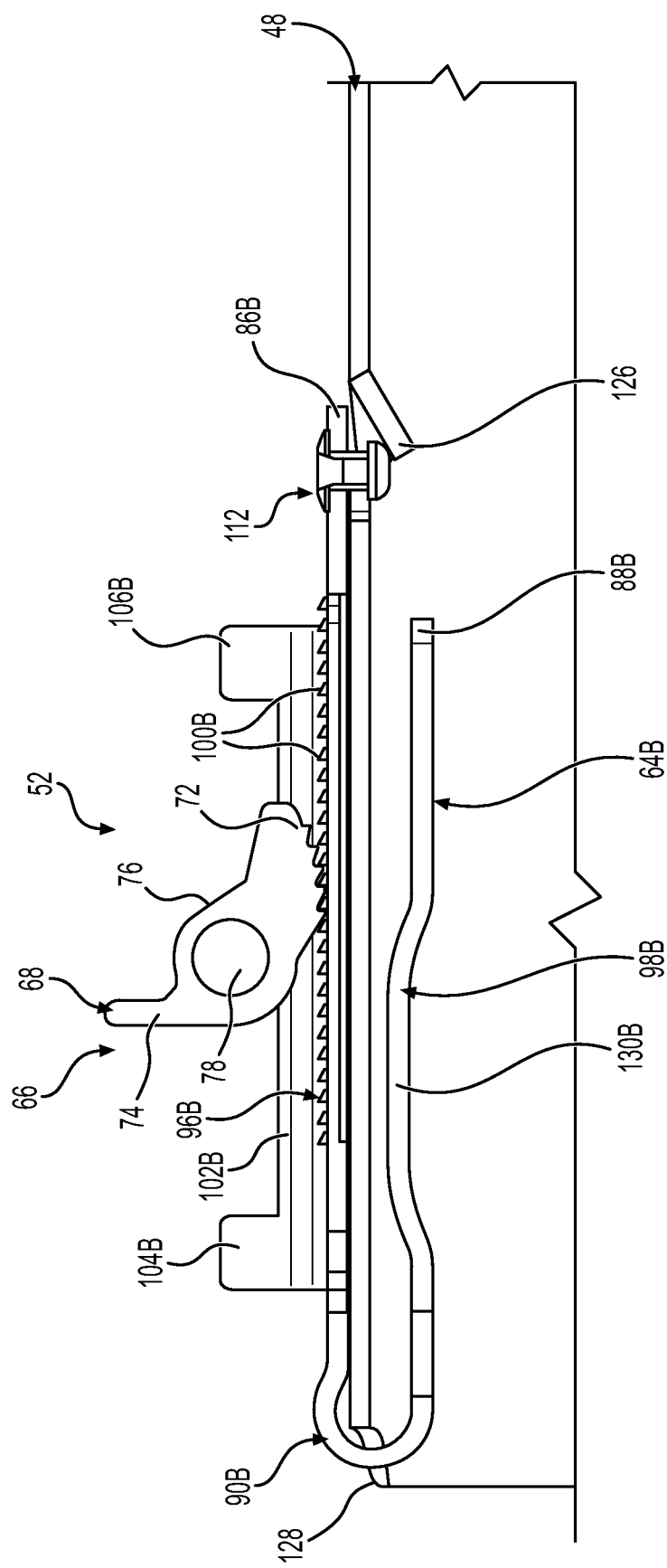
FIG. 5 generally illustrates a side view of the energy absorption apparatus with a strap body in accordance with a second arrangement.

With reference now to FIG. 5, the strap body 64B is illustrated in accordance with a second arrangement. The strap body 64B may include all the same features, constructions, and materials as described in the first arrangement. However, the strap body 64B may include a modified connection to the first jacket 48. More particularly, the strap body 64B may include a single upper aperture 108B. The upper aperture 108B may be located near a first end 64B. A connector 112 (e.g. a rivet) may extend through the upper aperture 108B and into a connector opening 114 as described previously. In some embodiments, a first segment 96B may extend along the axis A from the intermediate portion 90B a first distance and a second segment 98B may extend from the intermediate portion 90B a second distance that is less than the first. In some embodiments, a second end 88B may terminate before the upper aperture 108B.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

What is claimed is:

1. An axially adjustable steering column comprising:
a first jacket and a second jacket that is axially movable with respect to the first jacket;
the first jacket including at least one connector opening;
an energy absorbing assembly including a strap body that is connected to the first jacket with at least one fastener extending through the strap body and the at least one connector opening, wherein the at least one connector opening includes an ejection aperture and a retaining slot.

2. The steering column of claim 1, wherein fastener includes an upper head, a lower head, and a body.

3. The steering column of claim 2, wherein the retaining slot is sized to prevent the lower head to pass therethrough.

4. The steering column of claim 3, wherein the body is located in the retaining slot.

5. The steering column of claim 4, wherein the first jacket extends from an upper end of the steering column and the second jacket extends from a lower end of the steering column.

6. The steering column of claim 5, wherein the retaining slot is oriented towards the lower end with respect to the ejection aperture.

7. The steering column of claim 6, wherein a ramp extends into the ejection aperture to route the lower head out of the connector opening when the first jacket is compressed relative to the second jacket along the axis A.

8. The steering column of claim 7, wherein the ramp extends from an outer surface of the first jacket and into the ejection aperture towards the retaining slot.

9. The steering column of claim 8, wherein the ramp is semi-bowl shaped.

10. The steering column of claim 1, wherein the at least one connector includes a rivet.

11. The steering column of claim 1, wherein the at least one connector opening includes a pair of connector openings with ejection apertures and the at least one connector includes a pair of connectors.

12. An axially adjustable steering column comprising:
a first jacket and a second jacket that is axially movable with respect to the first jacket;
the first jacket including at least one connector opening;
an energy absorbing assembly including a strap body that is connected to the first jacket with at least one fastener extending through the strap body and the at least one connector opening, wherein the second jacket includes a window and the energy absorbing assembly includes a lock cam at least partially located in the window and connected to the second jacket.

13. The steering column of claim 12, wherein the lock cam includes a toothed portion for selective engagement with the strap body.

14. An energy absorbing assembly for axially adjustable steering column, the energy absorbing assembly comprising:
a strap body extending between a first end configured to be located on an exterior of a first jacket and a second end configured to be located on an interior of the first jacket;
a curved portion located between the first end and the second end;
a first segment extends between the curved portion and the first end and a second segment extends between the curved portion and the second end;
the first segment including at least one upper aperture for receiving a fastener to connect the first segment to the exterior of the first jacket,
wherein the first segment defines a plurality of teeth,
wherein the at least one upper aperture includes a pair of upper apertures where each upper aperture is located on an opposite side of the teeth.

15. The energy absorbing assembly of claim 14, wherein the second segment includes a lower aperture for receiving a rivet tail prior to it being deformed.

16. The energy absorbing assembly of claim 14, wherein the second segment includes a bowed portion extending towards the first segment.

17. An energy absorbing assembly for axially adjustable steering column, the energy absorbing assembly comprising:
a strap body extending between a first end configured to be located on an exterior of a first jacket and a second end configured to be located on an interior of the first jacket;
a curved portion located between the first end and the second end;
a first segment extends between the curved portion and the first end and a second segment extends between the curved portion and the second end;
the first segment including at least one upper aperture for receiving a fastener to connect the first segment to the exterior of the first jacket, wherein the fastener is located in the upper aperture and configured to be ejected from an opening having a ramp in the first jacket to disengage the connection thereto.

\* \* \* \* \*